UNITED STATES PATENT OFFICE.

WYATT C. STARR, OF HOSFORD, FLORIDA.

TREAD-WHEEL.

1,377,447. Specification of Letters Patent. Patented May 10, 1921.

Application filed April 15, 1920. Serial No. 374,055.

*To all whom it may concern:*

Be it known that I, WYATT C. STARR, a citizen of the United States, residing at Hosford, in the county of Liberty and State of Florida, have invented a new and useful Tread-Wheel, of which the following is a specification.

It is the object of this invention to provide a vehicle wheel so constructed that it may be used in swamps and elsewhere, upon soft ground, novel means being provided whereby the tread members are flexibly connected with the wheel rim.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
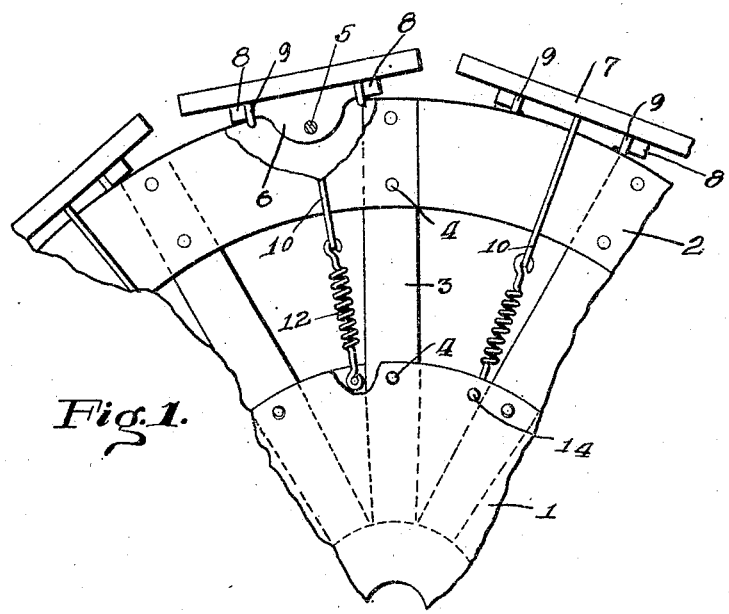
Figure 2:
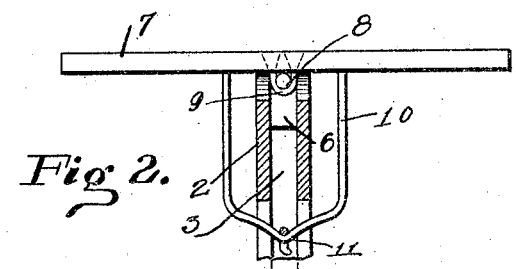
Figure 3:
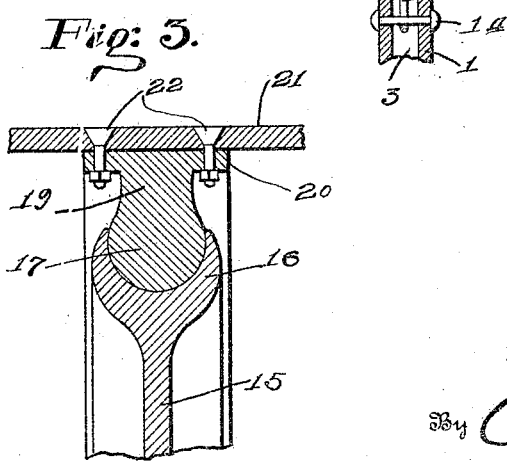

Figure 1 shows in side elevation, a device constructed in accordance with the invention, parts being broken away; Fig. 2 is a fragmental transverse section wherein parts are broken away; Fig. 3 is a fragmental transverse section showing a modification.

Referring to Figs. 1 and 2, there is shown a portion of a wheel, including hub plates 1, rim plates 2 and spokes 3, the outer ends of the spokes being disposed between the rim plates 2 and the inner ends of the spokes being disposed between the hub plates 1, securing elements 4 serving to attach the spokes to the hub plates and the rim plates. The wheel, however, may be of any desired construction. Supports 5 are located in the rim plates 2 and serve as pivotal mountings for carriers 6 which have reduced ends 8 which are preferably circular in cross section, the outer longitudinal edge of each carrier 6 being rounded to correspond with the shape of the reduced ends 8. Laterally extended transverse tread members 7 are mounted on the carriers 6.

U-bolts 9 or the like connect the tread members 7 with the reduced ends 8 of the supports 6. U-shaped yokes 10 are connected to the tread members 7 and extend transversely of the wheel, the yokes 10 being supplied at their inner ends with reduced seats 11, receiving and holding the outer ends of retractile springs 12, the inner ends of which extend between the hub plates 1. The inner ends of the springs 12 are connected to the hub plates 1 by securing devices 14.

In practical operation, the carriers 6 have a swinging movement in a direction parallel to the median plane of the wheel, the tread members 7 participating in this movement. Further, the tread members 7 can rock, transversely of the median plane of the wheel, on the carriers 6, since the tread members 7 are connected to the reduced ends 8 of the carriers 6 by the U-bolts. The tread member 7, therefore, has a peculiar compound movement, the result being that the tread members will conform readily to irregularities of all kinds in the surface of the ground. The swinging movement of the carriers 6 on the supports 5 is limited by the springs 12, the springs serving, also, to limit and control the lateral or transverse movement of the tread members 7 on the carriers 6.

In the modification shown in Fig. 3 of the drawings, the wheel includes a web 15 having a trough-shaped rim 16 wherein is received, for rocking movement, the foot 17 of the carrier, which, preferably, is in the form of a continuous strip or tire, made of rubber or some other flexible material, including a reduced neck 19 having a transverse flange 20, tread members 21 being connected to the flange 20 by bolts 22 or the like. The construction of the device, as shown in Fig. 3, is such that the tread member 21 may swing both transversely of the median plane of the wheel and circumferentially of the wheel.

The tread members 7 and 21 may be fashioned from any desired material.

Having thus described the invention, what is claimed is:—

In a device of the class described, a wheel; carriers pivoted to the wheel for rocking movement circumferentially of the wheel; tread members pivoted to the carriers for rocking movement transversely of the wheel;

springs connected to the wheel; and means for connecting the springs with the tread members to tension the springs when the tread members rock transversely of the wheel and when the carriers rock circumferentially of the wheel.

In testimony that I claim the foregoing as my own, I have hereto affixed my signature in the presence of two witnesses.

WYATT C. STARR.

Witnesses:
    NEWTON CROW,
    J. P. CHAPMAN.